UNITED STATES PATENT OFFICE.

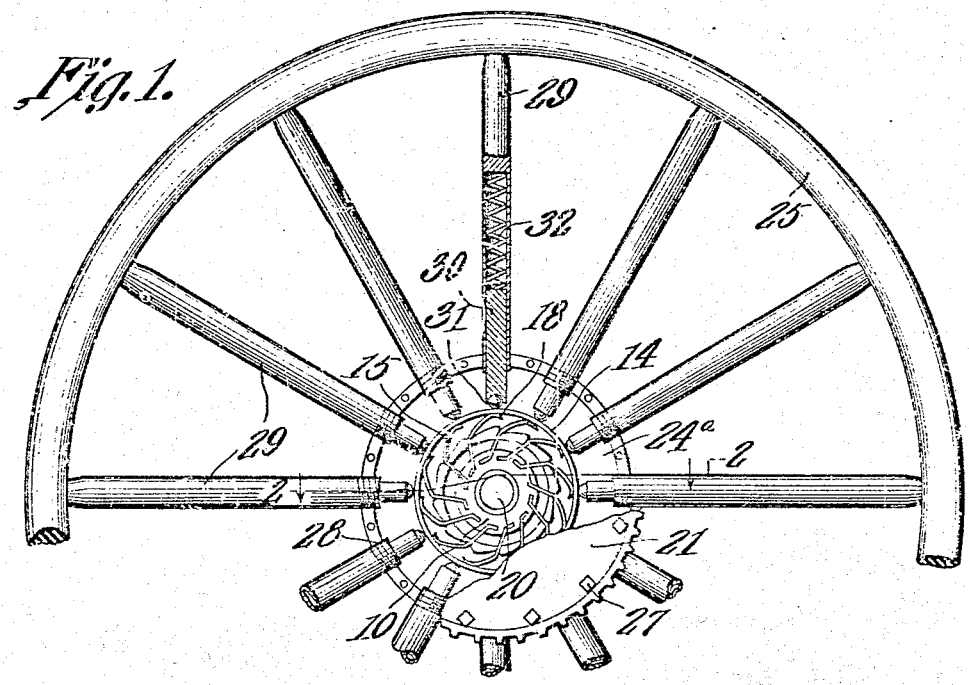

IRA W. MISENSOL AND MARTIN BOYER, OF LOWRY, MINNESOTA.

VEHICLE-WHEEL.

1,009,850.  Specification of Letters Patent.   Patented Nov. 28, 1911.

Application filed February 18, 1911. Serial No. 609,320

*To all whom it may concern:*

Be it known that we, IRA W. MISENSOL and MARTIN BOYER, citizens of the United States, residing at Lowry, in the county of Pope, State of Minnesota, have invented a new and useful Vehicle-Wheel, of which the following is a specification.

It is the object of the present invention to provide an improved vehicle wheel of the spring type.

One aim of the invention is to provide a wheel of this type embodying a hub to which are removably and interchangeably fitted a number of cushioning springs bearing against and supporting a floating annulus against which annulus bears the inner ends of spokes carried by the tire-supporting rim of the wheels, removal of certain ones of the said springs serving to render the wheel more yieldable to shocks.

A further novel feature of the invention resides in the manner in which the springs are assembled with the hub, this being so accomplished that the springs may not be withdrawn radially from the slots in the hub in which they are fitted, but must be withdrawn laterally.

In the accompanying drawings,—Figure 1 is a view partly in elevation and partly in section of a wheel constructed in accordance with the present invention, parts being broken away. Fig. 2 is a horizontal sectional view on the line 2—2 of Fig. 1. Fig. 3 is a side elevation of a portion of the hub of the wheel. Fig. 4 is a perspective view of one of the cushioning springs carried by the hub. Fig. 5 is a sectional view on the line 5—5 of Fig. 3. Fig. 6 is a perspective view of a portion of the inner rim of the wheel.

In the drawings,—the hub of the wheel is indicated by the numeral 10 and is formed with transverse slots 11, each slot, at one end, being deepened as at 12. Between each pair of slots 11, the periphery of the circumferential surface of the hub is eccentric to the axis thereof as at 13. The purpose of so forming the hub will be presently fully explained.

Surrounding the hub is a floating annulus 14 and between the hub and annulus are provided cushioning springs 15 each having a tang portion 16 fitted removably in one of the slots 11. It will be observed that the deepened portion 12 of each slot extends at an angle to the main portion thereof and the tang portion 16 of each cushioning spring 15 is formed with a projection 17 extending at an angle to the said tang portion and fitting in the deepened portion 12 of the slot. This peculiar formation of the slot and the tang of each spring provides for ready insertion of the tang in the slot in a lateral direction but effectually prevents their withdrawal in a radial direction and inasmuch as the hub is confined between certain elements to be presently specifically described, this engagement of the springs from the hub while the wheel is in use is positively prevented. The springs 15, near the free ends, are curved or bent over as at 18 so as to prevent their extremities coming in contact with the annulus 14 and at their said ends, the springs are preferably decreased in thickness as clearly shown in Fig. 4 of the drawings. It will be observed that the distance between the axis of the hub and the circumferential surface thereof at that side of each slot 11 over which the body of the respective spring 15 extends, is less than the distance between the axis of the hub and the circumferential surface of the hub at the other side of the slot. As a consequence, even should the wheel be subjected to such shock as would momentarily bring its annulus 14 against the circumferential surface of the hub, the springs at their bends between their bodies and tang portions, would not be broken as would otherwise be the case.

The hub 10 is formed with a lateral sleeve 19 which receives the axle 20 upon which the wheel is mounted and a hub plate indicated by the numeral 21 has a sleeve portion 22 fitting upon the sleeve 19. Bolts 23 are secured through the two sleeves 19 and 22 and bear against the axle 20. The wheel includes, further, in its structure, an inner rim 24 and an outer rim 25, which latter will be presently and more specifically referred to. The rim 24 is made up of two sections of counterpart structure, one of the sections being however indicated specifically by the reference numeral 24$^a$ and the other by the reference numeral 24$^b$. Each of the sections of the inner rim has a peripheral flange formed with semicircular recesses 26, the wall of each recess being formed with screw-threads and the recesses of the two sections coöperating, when the sections are fitted together and secured by bolts 27, to receive the threaded inner ends 28 of spoke sections 29. These sections at their outer ends are suitably fitted into the rim 25. The sections 29 of the spokes are hollow from their inner ends to a point near their outer ends and slidably fitted in each section 29 is a spoke section 30, whose inner end is socketed to receive the ball 31, and whose outer end fits in the section 29 and bears against a spring 32 inclosed in the respective sections 29. The hub plate 21 closes the opening 33 which is formed in the body of the section 24ª of the inner rim and, in a like manner, a cap 34 closes the opening in the body of the section 24ᵇ, this cap being removable to expose the side of the hub in which the deepened portion 12 of the slots are formed.

It will be observed that that face of the hub in which the deepened portions of the slots are formed, is formed with an annular recess 35 into which the jaws of a pair of pliers may be readily inserted for the purpose of gripping any one of the springs 15 prior to removal of such springs.

What is claimed is:—

In a vehicle wheel, a hub formed with transverse slots, the circumferential surface of the hub at points between the slots being eccentric to the axis of the hub, the distance between the axis and the circumferential surface of the hub at one side of each slot being less than at the other side thereof, cushioning springs having tang portions fitted in the slots, the bodies of the springs projecting over the circumferential surface of the hub between the slots, an annulus surrounding the hub and cushioned by the springs, two concentric rims, and spokes carried by the rims and having their inner ends projecting within the inner concentric rim and bearing against the annulus.

In testimony that we claim the foregoing as our own, we have hereto affixed our signatures in the presence of two witnesses.

IRA W. MISENSOL.
MARTIN BOYER.

Witnesses:
I. M. ENGEBRETSON,
W. E. MABIE.